(No Model.) 2 Sheets—Sheet 1.
L. WAKEFIELD.
STEAM PLOWING MACHINE.
No. 339,236. Patented Apr. 6, 1886.
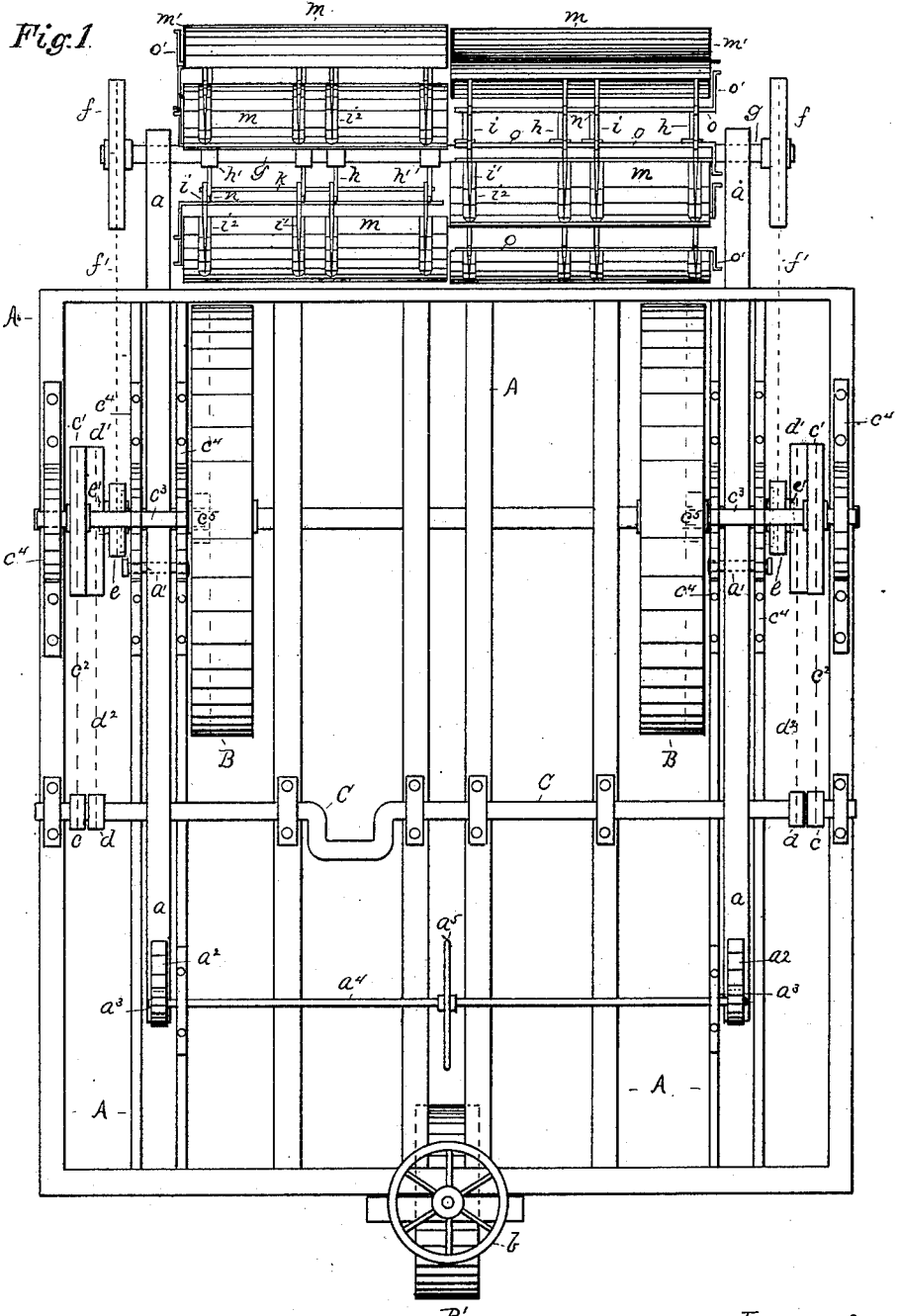
Witnesses:
H. H. Brace
J. F. Collom
Inventor:
Lewis Wakefield
By P. H. Gunckel
Attorney.

(No Model.) 2 Sheets—Sheet 2.
L. WAKEFIELD.
STEAM PLOWING MACHINE.
No. 339,236. Patented Apr. 6, 1886.
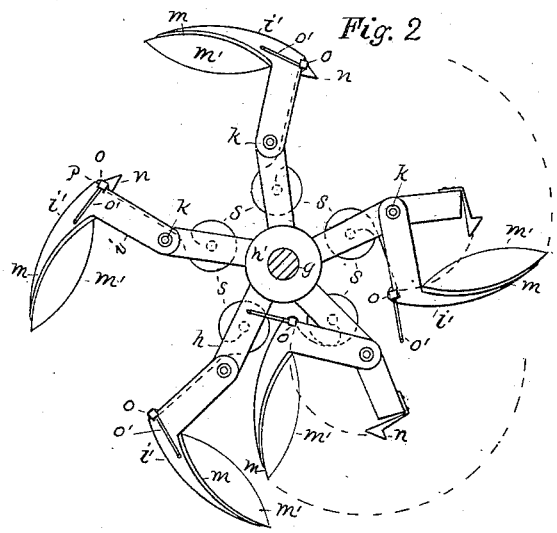
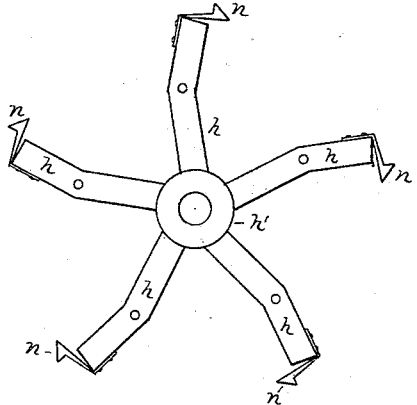
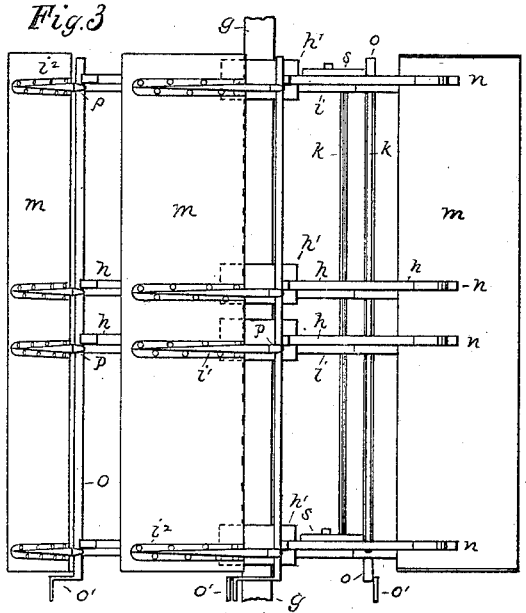
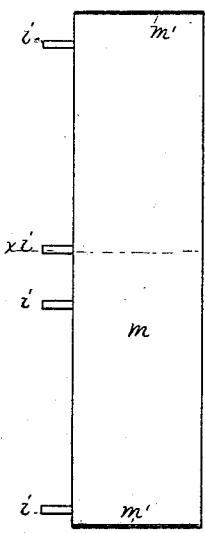
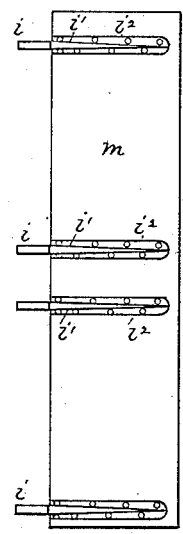
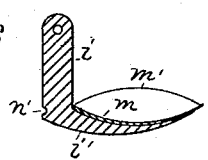
Witnesses:
H. H. Brace
J. F. Collom
Inventor:
Lewis Wakefield
By P. H. Gunckel
Attorney.

UNITED STATES PATENT OFFICE.

LEWIS WAKEFIELD, OF MINNEAPOLIS, MINNESOTA.

STEAM PLOWING-MACHINE.

SPECIFICATION forming part of Letters Patent No. 339,236, dated April 6, 1886.

Application filed September 12, 1885. Serial No. 176,903. (No model.)

*To all whom it may concern:*

Be it known that I, LEWIS WAKEFIELD, a citizen of the United States, residing at Minneapolis, in the county of Hennepin and State of Minnesota, have invented certain new and useful Improvements in Steam Plowing-Machines, of which the following is a specification.

The invention relates to machines propelled and operated by steam for the preparation of ground for crops; and the object of the invention is the production of a machine which will do fast and thorough work. This object is accomplished by the mechanism illustrated in the accompanying drawings, in which—

Figure 1 is a plan of the entire machine without the engine. Figs. 2 and 3 are respectively end and top views of the plowing mechanism. Figs. 4 and 5 are respectively inside and outside views of one of the shares with its supporting-arms. Fig. 6 is a transverse section on the line $x\ x$ of Fig. 5, and Fig. 7 shows the spider.

A represents a frame-work for supporting an engine and the necessary mechanism for operating the plows.

B B are the traction-wheels upon which the frame and machinery are supported and by which they are propelled. The axles of these wheels are boxed at the under side of the frame-work.

B' is a caster-wheel at the forward end of the frame, to enable the machine to be steered or turned short round at the end of a furrow. It is operated by the hand-wheel $b$.

Any desirable engine may be used for driving the machinery. It should be mounted on the frame-work between the wheels B and arranged to drive the crank-shaft C.

$c\ c$ are chain-wheels on the shaft C, to drive the wheels $c'$ by means of chains $c^2$. (Shown by dotted lines.) The wheels $c'$ drive the shafts $c^3$, which are mounted on supports $c^4$ above the frame.

On the inner ends of the shafts $c^3$ are pinions $c^5$, (shown by dotted lines,) for engaging internal gears in the wheels B, whereby the machine is propelled.

$d\ d$ are also chain-wheels on the shaft C, and by means of chains $d^2$ drive the wheels $d'$. The wheels $d'$ are on short shafts journaled on the frame A.

$e\ e$ are loose sprocket-wheels on the shafts which carry the wheels $d'$, and are provided with clutches $e'$, by which they may be connected to the wheels $d'$, so as to run with them, and when thus connected drive the wheels $f$ by means of chains $f'$, for operating the plowing devices. The shaft $g$, upon which are the wheels $f$, is journaled at the under side of two projecting beams, $a\ a$. The beams $a$ are connected to the frame A by bolts $a'$ near the middle of the beams, thus pivoting the beams, to permit their ends to be raised or lowered. On the forward ends of the beams are segmental racks $a^2$, operated by pinions $a^3$, for raising or lowering the ends of the beams. The pinions $a^3$ are on a rod, $a^4$, which is boxed above the frame and turned by a hand-wheel, $a^5$. By means of these devices the depth of the plowing can be regulated or the plows lifted above the ground. The shaft $g$ carries a series of arms, $h$, projecting radially from bosses $h'$, which are keyed to the shaft. These arms are ranged in five equidistant series, and there are two sets of them, so arranged that the arms of one set are midway between those of the other, in order that the shares carried by the one set of arms will strike the ground midway between those of the other set. The shares $m$ are of concavo-convex form in cross-section, preferably about four feet long and one foot across. On their ends are colters $m'$, of curved form, and at right angles to the surface of the shares, for cutting a smooth edge to the furrow. The shares are bolted to flanges $i^2$, which project laterally from ribs $i'$, the ribs and flanges being curved to conform to the curve of the shares, and flat arms $i$ extend at about right angles from the plane of the shares. A rod, $k$, is run through the upper portion of the arms $i$, and through the arms $h$ near their middle, thereby pivoting them to the arms $h$. The arms $h$ are somewhat crooked for the purpose of allowing the pivoted arms to turn upward without causing the shares to strike against the adjoining fixed arm. At the outer ends of the fixed arms are catches $n$, for holding the shares in place. These catches engage square rods $o$, which are secured on the back edges of the pivoted arms by clips $p$, passing over rounded portions of the rods, and the round portions of the rods are held in semicircular notches $n'$ in the edges of the arms.

On the outer ends of the rods o are cranks o', projecting beyond the ends of the shares. A bar extends downward from each of the beams a directly under the shaft g, and these bars are provided with suitable catches for temporarily arresting the forward movement of the cranks, to give them a partial turn and cant the rods o. The canting of the rods o releases the catches n from engagement with the rods, and the shares are free to turn on their pivot-rods k; and when, in operation, the shares are thus released from the fixed arms, the weight of the earth caught up by the shares will retard their forward movement momentarily, causing them to assume a nearly-vertical position until the earth has been discharged. Springs s, having one end attached to the fixed arms h and the other to the rods o, serve to turn the rods back after the cranks o' are free from their catches, and these springs may be of sufficient strength to aid also in retracting the shares to their normal positions. When, however, the shares are rotated with speed, their centrifugal force will throw them into position after they are free from the ground.

Having described my invention, what I claim, and desire to secure by Letters Patent, is—

1. In a plowing-machine, a series of spiders, a series of concavo-convex shares pivoted to said spiders, rods connected to said shares, and catches on the spider-arms engaging therewith, cranks on said rods, and trips for engaging said cranks to cant the rods, substantially as and for the purpose set forth.

2. In a plowing-machine, a series of spiders, means for rotating said spiders, a series of concavo-convex shares pivoted to the arms of said spiders, rods connected to said shares, and catches on the spider-arms engaging therewith, cranks on the ends of said rods and trips for engaging said cranks to cant the rods, and springs attached to said rods and to the spider-arms, substantially as and for the purpose set forth.

3. In combination, the spider-arms h, the pivoted arms i, having curved projecting portions i', provided with flanges i², and the shares m, having colters m', substantially as and for the purpose set forth.

LEWIS WAKEFIELD.

Witnesses:
H. H. BRACE,
P. H. GUNCKEL.